United States Patent Office 3,427,007
Patented Feb. 11, 1969

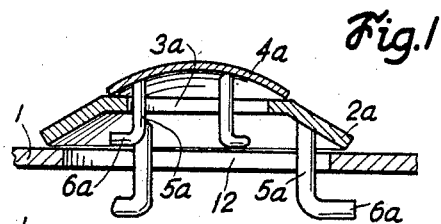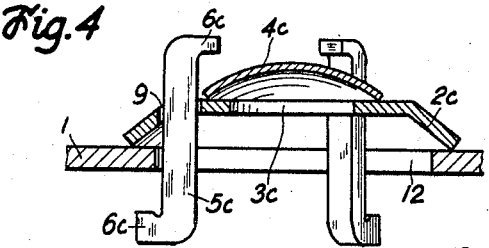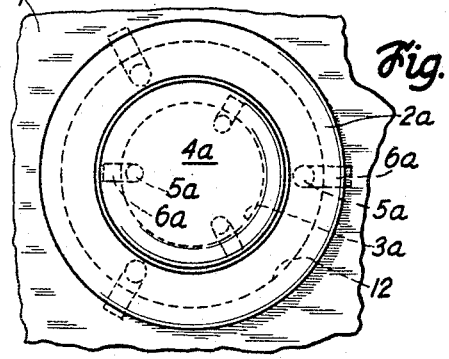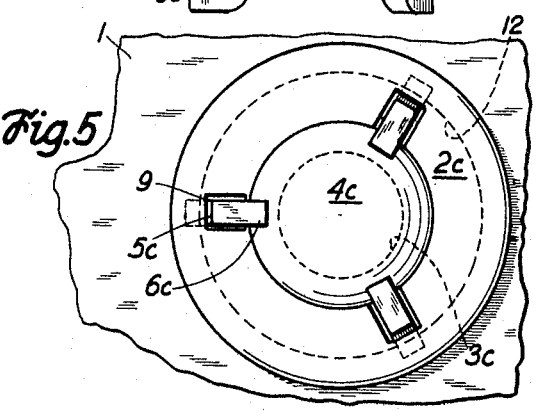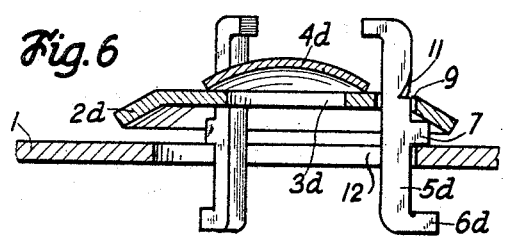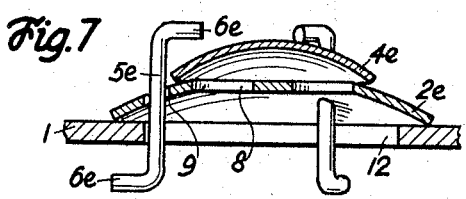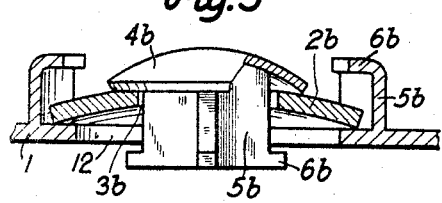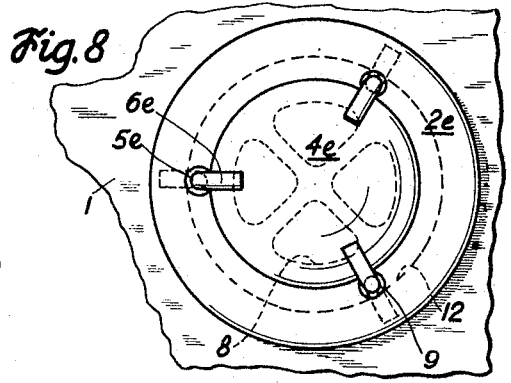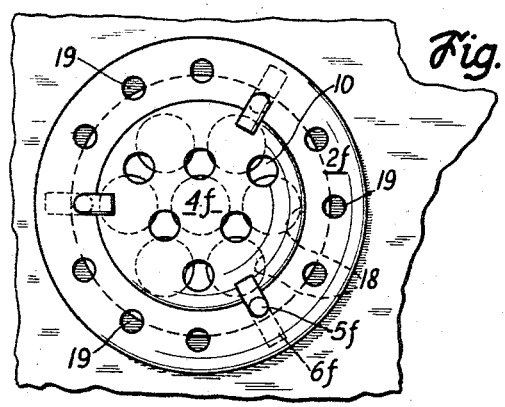

3,427,007
BUBBLE CAP ASSEMBLIES FOR BUBBLE TOWERS
Vlastimil Braun, Brno, Czechoslovakia, assignor to Chepos, Zavody chemickeho a potravinarskeho strojirenstvi oborovy podnik, Brno, Czechoslovakia
Filed Feb. 20, 1967, Ser. No. 618,300
Claims priority, application Czechoslovakia, Feb. 21, 1966, 1,101/66; Apr. 25, 1966, 2,742/66
U.S. Cl. 261—114                           5 Claims
Int. Cl. C02d 1/04

ABSTRACT OF THE DISCLOSURE

A gas and liquid contact apparatus having a bubble tower plate adapted to carry a liquid and formed with an opening through which a gas or vapor is adapted to flow upwardly through the plate to contact the liquid. A bubble cap assembly is carried by the plate over the opening thereof and includes a lower cap situated over the plate opening and itself formed with an opening through which the gas or vapor is adapted to flow, the bubble cap assembly further including an upper cap situated over the opening of the lower cap to receive the gas or vapor which passes through both of the above openings. The upper cap is lighter than the lower cap so that the upper cap will be raised away from the lower cap before the lower cap is raised away from the plate.

---

The invention relates to gas and liquid contact apparatus and in particular to bubble cap assemblies which coact with liquid-supporting trays of bubble towers to control the flow of gas upwardly through the tower while the liquid flows downwardly therethrough and to bring the fluids into contact with each other. Thus, with the structure of the invention the upwardly flowing fluid will have intimate contact and thorough mixing with the liquid carried by the plate which forms the tray, providing an intimate heat exhcange between these fluids or any other transfer therebetween. Structures of this general type are used in towers or columns in petroleum or other chemical applications, such as fractional distillation or rectification and adsorption, where a fluid in the form of a gas or vapor, on the one hand, and a fluid in the form of a liquid, on the other hand, are brought into contact with each other for separation, recovery, refinement or purification of the recovered products.

The various liquid-carrying plates are situated at different elevations in the bubble tower one over the other and are formed with openings through which the upwardly flowing fluid passes to contact the liquid on the plates. The bubble cap assemblies cover the plate openings and respond to the pressure of the upwardly flowing fluid to be lifted from the plates, thus providing passage of the ascending fluid through the plate openings and the intimate contact between the liquid on the plates and the upwardly flowing fluid so that diffusion processes, for example, can take place.

Background of the invention

Towers of the above general type are very widely used in chemical industries. Undoubtedly such towers are the most commonly employed rectifying apparatus in use at the present time, the use thereof accounting for probably 80% of the entire production of rectifying columns. Therefore, the continued development and improvement of these structures is of considerable importance with respect to such factors as low price, wide flexibility, and high through-put capacities.

While simple single-caps have been situated over the plate openings of the towers, it is also known to use over each plate opening a bubble cap assembly including a plurality of caps. These caps overlie each other as well as the plate opening and are loosely confined and freely movable with the lowermost cap forming a closure member for closing the plate opening and being lifted by the upwardly flowing fluid so as to initially provide for flow of the gas or vapor upwardly through the plate opening when the pressure differential across the plate is at a minimum. One or more additional upper caps are situated over the lower cap of each assembly, and the raised lower cap will engage and control the raising of the upper caps so as to provide for additional opening of the bubble cap assembly with an additional uncovering of the plate opening as a result of an increase in the pressure differential across the plate and of the upward flow of the gas or vapor through the plate, this action taking place up to the maximum lift of the bubble cap assembly which is permitted by the structure thereof.

Structures of this latter type have several disadvantages. Thus, there are difficulties encountered in assembling the structure since it is only the uppermost plate or cap of each bubble cap assembly which can be provided with a central aperture through which fastening tools or the like can extend for assembling the structure. Furthermore, while such multiple-cap assemblies provide an increase in the space through which the upwardly flowing fluid can move between minimum and maximum rates of flow through the plate opening, as a result of the successive additional raising of the individual caps of the assembly, nevertheless there are many advantageous possibilities which are not made use of with the known structure. Thus, the total area of flow for the ascending fluid with this conventional structure is relatively small and can be enlarged, by successive raising of individual caps, only at a slow rate up to the maximum rate of flow achieved when maximum lift is reached, and the extent of lift is limited because the efficiency of the flow through the plate opening decreases with an increase in the extent of lift of the bubble caps.

Summary of the invention

It is accordingly a primary object of the present invention to provide a simple and inexpensive assembly of the above general type which has components which can be readily assembled and which will operate with a greater efficiency than conventional structure providing for an increased flow path, as the rate of flow and pressure differential increases, by increasing the cross sectional area of the flow path for the ascending fluid without influencing in any way the efficiency of the flow through the plate which carries the liquid.

It is thus also a general object of the invention to provide a uniform distribution of the ascending fluid with respect to the liquid on the plates, providing an intimate contact and thorough mixing of the ascending fluid with the liquid.

Another object of the invention is to provide for a structure of the above type a simple and reliable guide means which will guide bubble caps during their movement and also to provide a simple and reliable limiting means for limiting the extent of movement of the bubble caps.

Furthermore, it is an object of the invention to provide not only a uniform distribution of the ascending fluid as it flows upwardly through the plate openings, but in addition, during the counter-current of flow of the contacting liquid with the upwardly flowing gas or vapor, to provide for a downward liquid flow through the column and transversely across the plates or trays thereof without any stagnant areas of little or no liquid movement where foreign matter can collect.

An additional object of the invention is to provide a bubble cap assembly capable of preventing a reduction in the spacing between caps of the assembly during successive movement of the caps away from the plate.

Yet another object of the present invention is to provide a construction which will reduce the extent of pressure drop across the trays or plates to a minimum while achieving an intimate contact and thorough mixing of the ascending fluid with the descending liquid at low loads and even in cases where the plates or trays are not installed in perfectly horizontal attitudes and irrespective of constructional obstructions to the liquid flow, so that there is no hydraulic gradient even under unusually high rates of flow while at the same time the structure is flexible enough to operate with high efficiency at varying rates of flow.

According to the invention each bubble cap assembly coacts with a single opening of the plate on which the liquid is situated, and each assembly includes a lower cap situated on the plate over the opening thereof and having a downwardly directed hollow interior, this lower cap having an outer periphery which is situated outwardly beyond the plate opening so that the latter is covered by the lower cap. The lower cap is formed with an opening which is in turn covered by an upper cap of the bubble cap assembly, this upper cap having a downwardly directed hollow interior, so that in this way a gas or vapor which flows upwardly first through the plate opening and then through the opening of the lower cap will be received in the interior of the upper cap.

In accordance with the invention, the upper cap is lighter than the lower cap so that it is the upper cap which is raised before the lower cap, to increase the cross sectional area of the path through which the ascending fluid flows, and it is only at increasing pressure differentials and rates of flow that the lower cap is raised away from the plate to further increase the cross sectional area through which the ascending fluid can flow. A guide means is provided to guide the upper and lower caps for substantially vertical movement, and a limiting means is provided for limiting the extent of movement of these caps of the assembly of the invention. The guide means and limiting means coact with the caps to provide upward movement of the upper cap together with the lower cap after the upper cap reaches its maximum distance from the lower cap and the lower cap moves upwardly away from the plate, so as to maintain the maximum spacing between the caps during movement of the lower cap upwardly from the plate.

While the invention is illustrated below as including, for each bubble cap assembly, only two caps, the invention can be practiced with additional caps arranged in such a way that each cap of a given bubble cap assembly is lighter than the next lower cap while being heavier than the next upper cap.

*Brief description of the drawings*

The invention is illustrated, by way of example, in the accompanying drawings, which form part of this application and in which:

FIG. 1 shows, in a transverse section, one possible embodiment of a bubble cap assembly according to the invention, this bubble cap assembly being shown together with an opening of a tray plate;

FIG. 2 is a top plan view of the structure of FIG. 1;

FIG. 3 is a transverse sectional elevation of another embodiment of a bubble cap assembly according to the invention;

FIG. 4 is a transverse sectional elevation of a further embodiment of a bubble cap assembly according to the invention;

FIG. 5 is a top plan view of the structure of FIG. 4;

FIG. 6 is a transverse sectional elevation of a still further embodiment of a bubble cap assembly according to the invention, also shown with a tray plate at an opening thereof;

FIG. 7 is a transverse sectional elevation of yet another embodiment of a structure according to the invention;

FIG. 8 is a top plan view of the structure of FIG. 7; and

FIG. 9 is a top plan view of yet another possible embodiment of a structure according to the present invention.

Detailed description

Referring to FIGS. 1 and 2, there is shown therein a portion of a tray plate 1 which carries liquid and forms part of a bubble tower in a gas and liquid contact apparatus. It is to be understood that there are, as is well known, a series of these plates 1 arranged one above the other in the tower and each formed with a plurality of openings 12 so that the gas or vapor can flow upwardly through these openings 12 while the liquid flows downwardly from plate to plate.

In the embodiment of FIG. 1 the bubble cap assembly includes a lower cap 2a which has a downwardly directed hollow interior and which has an outer periphery located beyond the opening 12 and engaging the upper surface of the plate 1 at a portion thereof which surrounds the opening 12. This lower cap 2a has a substantially flat top wall portion and a frustoconial peripheral wall portion extending downwardly from its top wall portion and having the lower cap periphery which engages the top surface of the plate 1 when the lower plate 2a is in its lower position shown in FIG. 1. This lower cap 2a is formed with a single opening 3a which registers with the opening 12, so that the upwardly flowing fluid will first flow through the opening 12 and then through the opening 3a.

The bubble cap assembly of the invention includes a second cap 4a having a downwardly directed hollow interior and forming part of a sphere, this cap 4a in the example of FIGS. 1 and 2 having no openings and consisting of a single sheet of suitable material. The outer periphery of the upper cap 4a is situated beyond the opening 3a and engages the top surface of the cap 2a in the lower position of the cap 4a which is shown in FIG. 1, so that in this way the opening 3a is closed by the cap 4a.

This cap 4a is lighter than the cap 2a, so that at a relatively low pressure differential and low rates of flow the upper cap 4a will first be raised away from the lower cap 2a, increasing the cross sectional area of the space through which the upwardly flowing fluid moves, and then, in a manner described below, during an increased pressure differential and increased rate of flow the lower cap will be raised away from the plate 1.

A guide means is provided to guide the caps 2a and 4a for substantially vertical movement with respect to the substantially horizontal plate 1, and this guide means includes a plurality of substantially upright components 5a which in the illustrated example are formed in two groups respectively fixed to and carried by the caps 2a and 4a.

Thus, there may be three or more upright components 5a in the form of elongated rigid rods or other suitable members fixed at their top ends to the lower surface of the cap 4a and extending therefrom downwardly through the opening 3a adjacent to the edge of the cap 2a which defines the opening 3a so that the group of components 5a connected to the upper cap 4a coact with this latter edge to guide the cap 4a for substantially vertical movement with respect to the lower cap 2a.

In much the same way, the guide means includes an additional group of substantially upright components 5a in the form of rigid rods, bars, or the like, fixed at their top ends to the lower surface of the lower cap 2a and extending therefrom downwardly through the opening 12 adjacent to the edge of the plate 1 which defines this opening 12, so that in this way the group of upright components 5a which extend through the opening 12 coact with this latter edge to guide the lower cap for movement with respect to the plate 1.

The bubble cap assembly of the invention further includes a limiting means for limiting, on the one hand, the extent of upward movement of the upper cap with respect to the lower cap, and, on the other hand, the extent of upward movement of the lower cap with respect to the plate 1. The limiting means is carried by the guide means and includes a plurality of substantially horizontal components 6a, which may form extensions of the elongated components 5a and which are fixed to and extend laterally therefrom in the manner shown in FIGS. 1 and 2.

As is apparent from FIG. 2, in the illustrated example, the various components of the guide means and limiting means are uniformly distributed about the caps 2a and 4a. Thus, where there are three components 5a fixed to each cap, these components are spaced from each other by 120° about the central axis of the cap.

As the cap 4a moves upwardly, the components 6a carried by the rods 5a which are fixed to the cap 4a will engage the downwardly directed surface of the cap 2a so as to limit the extent of upward movement of the cap 4a with respect to the cap 2a. Of course, during continued upward movement of the cap 4a, after the components 6a carried thereby engage the cap 2a, the latter cap 2a will be raised upwardly away from the plate 1, and this action will take place when there is a sufficient increase in the pressure differential and rate of flow of the upwardly moving fluid.

In much the same way, the horizontal components 6a, which may form integral extensions of the lower group of components 5a fixed to the bottom ends of the latter and projecting laterally therefrom beyond the opening 12 into overlapping relation with a downwardly directed surface of the plate 1 which surrounds the opening 12, will engage the lower surface of the plate 1 to limit the extent of upward movement of the cap 2a, and in this way the maximum path of flow for the upwardly moving fluid will be provided.

In the embodiment of the invention which is illustrated in FIG. 3, the lower cap 2b is similar to the cap 2a and coacts in the same way with the opening 12 of plate 1. Thus, this lower cap 2b is formed with a single opening 3b which is covered by the upper cap 4b which also forms part of a sphere and which closes the opening 3b when the upper cap 4b is in its lower position shown in FIG. 3, the lower cap 2b closing the opening 12 when this lower cap is in its lower position also shown in FIG. 3. In this embodiment the guide means includes the upright components 5b which are fixed to the lower surface of the upper cap 4b and extend therefrom not only through the opening 3b but also through the opening 12, so that in this way a considerable range of movement of the upper cap with respect to the lower cap can be provided while at the same time the entire structure is exceedingly compact and does not extend to an undesirably large height. These upright components 5b may take the form of relatively flat plates which extend vertically and which coact at their outer edges with the edge which defines the opening 3b so as to guide the upper cap 4b for movement with respect to the lower cap 2b. The limiting means includes the projections 6b extending laterally from and being integral with the plates 5b. These substantially horizontal components 6b, shown in FIG. 2 at an elevation lower than the plate 1, will engage the downwardly directed surface of the lower cap 2b which surrounds its opening 3b so as to limit the extent of upward movement of the upper cap 4b with respect to the lower cap 2b.

In the embodiment of FIG. 3, the second group of upright and horizontal components of the guide and limiting means, respectively, instead of being fixed to the lower cap 2b, are carried by the plate 1 with the upright components 5b of this latter group fixed to and extending upwardly from the plate 1 and situated adjacent the outer periphery of the lower cap 2b so as to coact with this outer periphery to guide the lower cap 2b for vertical movement with respect to the plate 1, after the limiting components 6b which are fixed to the upper cap engage the lower surface of the lower cap. The limiting means includes the substantially horizontal components 6b which are fixed to the top ends of the components 5b which extend upwardly from and are fixed to the plate 1, and this latter group of substantially horizontal components may form integral extensions of the upright stationary guiding components 5b and extend over the outer peripheral portion of the lower cap 2b so as to engage this outer peripheral portion and limit the extent of upward movement of the lower cap with respect to the plate 1.

In the embodiment of FIGS. 4 and 5, the guide means formed by the upright components 5c is carried only by the lower cap 2c. This lower cap 2c is similar to the caps 2a and 2b and is also formed with a single central opening 3c which is in alignment with the opening 12 of the plate 1. In this embodiment the upper cap 4c is substantially identical with the caps 4a and 4b and covers the opening 3c to close the latter when the upper cap 4c is in its lower position shown in FIG. 4, the lower cap 2c engaging the upper surface of the plate 1 beyond the opening 12 thereof when the lower cap 2c is in its lower position also shown in FIG. 4.

In this embodiment the guide means includes only a single group of upright components 5c respectively extending through suitable openings 9 which are formed in the lower cap 2c at locations beyond the upper cap 4c, and these upright components 5c extend above and below the cap 2c upwardly beyond the upper cap 4c and downwardly through the opening 12 to coact with the edge of the plate 1 which defines the latter opening so as to guide the lower cap for vertical movement. These upright components 5c may be fixed in any suitable way to the lower cap 2c, as, for example, by being tack-welded thereto.

The limiting means of this embodiment includes a plurality of laterally extending substantially horizontal components 6c which may form integral extensions of the upright components 5c, with a lower set of components 6c extending outwardly from the components 5c at the bottom thereof and an upper set of components 6c extending inwardly from the upright components 5c at the top ends thereof, as is apparent from FIGS. 4 and 5. FIG. 5 furthermore illustrates how the components of the guide means and limiting means are uniformly distributed. The upper components 6c extend over the plate 4c to engage the latter to limit its upward movement with respect to the lower caps 2c, while the lower components 6c extend outwardly beyond the opening 12 to engage the downwardly directed surface of the plate 1 which surrounds the opening 12 so as to limit the extent of upward movement of the lower cap 2c.

In the embodiment of the invention which is shown in FIG. 6, there is situated, over the opening 12 of the plate 1, a lower cap 2d which is also formed with a single central opening 3d which is covered by the upper cap 4d, and these caps of the bubble cap asembly of FIG. 6 may be substantially identical with the caps of the assembly described above. However, with the embodiment of FIG. 6 a spacer means 7 is provided between the plate 1 and the lower cap 2d to maintain the latter spaced above the plate 1 when the lower cap 2d is in its lowermost position shown in FIG. 6, and thus with this embodiment there is a minimum rate of flow of the upwardly moving fluid at all times. The guide means formed by the vertical components 5d may be identical with the components 5c, and the same is true of the limiting means 6d of the embodiment of FIG. 6 which may be identical with the limiting means formed by the components 6c of the embodiments of FIGS. 4 and 5. However, with the embodiment of FIG. 6 the several upright components 5d may be provided with lugs 11 struck therefrom and extending over the top surface of the cap 2d engaging this top surface while the spacer means 7 takes the form of projections extending laterally from the upright components 5d into the space between the plate 1 and the lower cap 2d and engaging the lower surface of the cap 2d. Therefore, by engagement of the lugs 11 and the spacer projection 7 respectively with the upper and lower surfaces of the cap 2d, the upright components 5d are also conveniently fixed to the cap 2d, so as to be carried thereby.

The embodiment of the invention which is illustrated in FIGS. 7 and 8 is substantially identical with that of FIGS. 4 and 5 and includes a lower cap 2e and an upper cap 4e, this lower cap 2e carrying upright components 5e which form a guide means in the same way as the upright components 5c, these upright components 5e fixedly carrying the substantially horizontal components 6e which are arranged in the same way as the horizontal components 6c so as to limit, on the one hand, the upward movement of the upper cap 4e with respect to the lower cap 2e and on the other hand, the upward movement of the lower cap 2e with respect to the plate 1. The manner in which the upright components 5e are tack-welded, for example, to the upper surface of the lower cap 2e is ilustrated in FIG. 7 where these upright components 5e are shown passing through openings 9 in the lower cap 2e.

In the embodiment of FIGS. 7 and 8, instead of a single opening passing through the lower cap, a plurality of openings 8 may be provided having the arrangement shown most clearly in FIG. 8 and all capable of being covered by the upper cap 4e.

The embodiment of the invention which is illustrated in FIG. 9 is substantially identical with that of FIGS. 7 and 8 except that the lower cap 2f of this embodiment, instead of being formed with a series of openings 8 as shown in FIGS. 7 and 8, is formed with a plurality of circular openings 18 all of which are covered by the upper cap 4f. In addition, the lower cap 2f is provided with a plurality of openings 19 situated outwardly beyond the upper cap, so that with this embodiment also there will at all times a certain minimum rate of flow of the upwardly moving fluid through the liquid carried by the tray plate 1. The guide means 5f has the same structure as the guide means 5e and coacts in the same way with the bubble caps to guide the latter for vertical movement, and the limiting means 6f has the same construction as the limiting means 6e and coacts with the caps to limit their upward movement in the manner described above in connection with FIGS. 7 and 8.

However, with the embodiment of FIG. 9, the upper cap 4f is also provided with a plurality of openings 10 through which the upwardly moving fluid can flow at any time, but these openings 10 are of a smaller size than the openings 18 and provide a smaller path of flow for the upwardly moving fluid, so that this embodiment also will respond to an increasing pressure differential for causing first the upper cap to move upwardly with respect to the lower cap and then the lower cap to move upwardly with respect to the plate 1.

In all of the disclosed embodiments of the invention the upper cap has a lower position resting on and engaging the lower cap, and in addition the upper cap is of a lighter weight than the lower cap, so that it is the upper cap which will be raised first during operation at relatively low rates of flow with a relatively low pressure differential across the plate 1. In order to achieve this arrangement where the upper cap will be raised first, it may be made of the same material as the lower cap but of a thinner sheet of metal and/or of a smaller diameter so that less material is included in the upper cap and therefore it is substantially lighter than the lower cap. Thus, in the illustrated example, the several caps of each assembly are of decreasing diameters in an upward direction and are also of decreasing weights in an upward direction. However, the same results may be achieved by varying the thickness or diameter of the plates or by a suitable choice of materials of different specific gravities. Thus, for example, porcelain or earthenware and plastics may be used for the bubble caps.

It is to be noted that with the structure of the invention the flexibility in the use of the trays is increased because the height of the liquid on the plate 1 can be regulated to provide a uniform fluid distribution at low loads even though the plate 1 may not be precisely horizontal and irrespective of other constructional obstructions due to a non-uniformly assembled structure on the upper surface of the plate 1. Thus, because even when the upper cap moves upwardly away from the lower cap the lower cap is still in engagement with the upper surface of the plate 1, except for the embodiment of FIG. 6, it will be seen that a certain height of liquid will be maintained on plate 1 even though the upper caps are displaced upwardly from the lower caps. Thus, there are no obstructions to the liquid flow and there is no hydraulic gradient even under unusually high rates of flow.

The spacer means 7 of FIG. 6 will prevent sticking of the lower cap 2d to the plate 1 of this embodiment, particularly during an interruption in the operation of the apparatus and especially when during the operations different sediments are separated and deposited or when coking tars or film polymerizations result therefrom. While it is possible to approach similar results by providing notches in the periphery of the lower cap, for example, or providing for the latter extensions which extend downwardly and engage the upper surface of plate 1, the spacers 7 are preferred because they engage the plate 1 at regions which are not moistened by the liquid during normal operations inasmuch as only the gas will flow through the space where the projections 7 are situated during normal operations.

Thus, a bubble tower which includes the apparatus of the invention will have a series of tray plates one arranged one above the other and each formed with a plurality of the openings 12 all of which respectively coact with the bubble cap assemblies of the invention as described above. The several plates 1 which are arranged one above the other will usually operate as overflow trays with suitable downcomers, the liquid flowing over one tray in the direction of liquid supply, and then overflowing the latter tray to be received on the next lower tray.

At relatively low rates of gas or vapor flow, the upper plates 4 will begin to rise, inasmuch as they are of a smaller diameter and made of a thinner material than the lower plates and so as to have a lesser specific gravity, and thus the gas or vapor bubbles through the several liquid layers on the several plates and forms a sheet of foam of low density. As the rate of flow of the upwardly moving fluid increases the upper caps of the assemblies of the invention continue to move upwardly until they reach their limit of upward movement with respect to the lower caps, and during a further increase in the rate of gas or vapor flow the upper caps entrain the lower caps so that the latter will now move upwardly with the upper caps so as to further increase the cross section of the space through which the upwardly moving fluid can flow. This latter operation will continue until the limiting means prevents further upward movement of the lower caps.

It is to be noted that when the upper cap has attained its greatest distance from the lower cap, this latter distance is not diminished during the upward movement of the lower cap since the structure of the invention enables the upper cap to move upwardly together with the lower cap, while maintaining the spacing therebetween, during the upward movement of the lower cap. Thus, with the invention the several flow passages created in and between the individual caps remain even during movement of the lowermost cap to its fully open position, because the caps remain separated from each other and do not approach each other as any one cap moves away from the plate. These several flow passages in combination with the relatively small extent of lift of the individual caps influence the dispersing of the ascending gas into small bubbles which assure a much larger surface between the contacting phases and production of a uniform, high-density foam, thus securing a very good dividing effect of the trays.

The above mentioned advantages achieved by the structure of the invention have been proved hydraulically. With the invention there is the possibility of producing a uniform low density flow while securing an intimate contact of both phases or mediums of the fluids with a wide flexibility and a high efficiency even at relatively low rates of fluid flow. The structure of the invention, however, is capable of being widely used for a number of different purposes even at regions of the tower where impact stresses take place, as for example, where the liquid is supplied or at lateral inlets and at top reflux inlets.

Because with the bubble cap assembly of the invention it is possible to provide a relatively large increase in the cross sectional area of the space through which the upwardly moving fluid flows in response to a relatively small extent of upward movement of the bubble caps, it is possible to provide exceedingly compact assemblies which do not extend to a very great height. Of course, the structure adapts itself to the operation with proportional lowering of the bubble caps as well as lifting thereof. Because of the large relative increase in the cross sectional area of flow of the upwardly moving fluid with respect to a relatively small extent of upward movement of the bubble caps of the invention, there is a more thorough distribution of the treated mixtures in the tower. Furthermore, by providing additional apertures such as those shown in FIG. 9, there is an assurance of even more uniform operation without any spray even at large rates of supply of liquid to the tower. Furthermore, in the case of rectification in a vacuum, where it is necessary to eliminate pressure losses, the caps must be of a material having a lesser specific gravity and a lesser thickness, and in such a case the single central aperture of relatively large diameter in an element such as the lower cap may undesirably lessen the rigidity of the lower cap and the stiffness thereof, so that in such a case it is preferable to use an arrangement as shown in FIGS. 7–9, where a plurality of openings are provided in the lower cap.

When the rate of liquid supply to the tower is relatively low, so that there is a danger of undesirable trickling, it is convenient to increase the area of the openings even up to the peripheries of the caps and particularly up to the periphery of the lower cap and to use in this case also an apertured upper cap, as shown in FIG. 9. In this manner, with the structure of FIG. 9, it is possible to eliminate undesirable pulsating movement of the caps, and the caps will begin to rise at higher rates of fluid flow than in those cases where a single central aperture is provided in the lower plate while the upper plate is of a single sheet which has no openings.

As a matter of convenience, it has proved to be expedient to provide for the cross sectional area of flow of the upwardly moving fluid an increase of 30–40% of the maximum load during movement of the upper cap with respect to the lower cap, and to provide for upward movement of the lower cap at a range of 60–75% of the maximum load.

The bubble cap assemblies of the invention also can be used in heavy operations for treating relatively dirty mixtures or coke or sediment-producing mixtures, because the turbulent flow which is evolved or created on the tray plate 1 assures a self-cleaning operation. In addition, with the structure of the invention there is a considerable simplification in the process and structure and a relatively convenient and easy assembly of the cap members not only with each other but also with the tray plate 1, as well as the possibility of precisely arranging the caps by means of tack seam or tack welding of the guide means thereto in the manner described above, although the bent-lug arrangement of FIG. 6 also will provide the desired precision in the assembly.

I claim:
1. In a gas and liquid contact apparatus,
(A) a bubble tower plate formed with an opening passing therethrough, and
(B) a bubble cap assembly controlling the flow of gas or vapor upwardly through said plate opening to provide contact between the gas or vapor, on the one hand, and a liquid on said plate, on the other hand, said assembly comprising
  (a) a lower cap situated over said plate and having a downwardly directed hollow interior, said lower cap having an outer periphery larger than said plate opening and in substantial alignment therewith so that said lower cap extends beyond said plate opening over said plate, and said lower cap being formed with at least one opening passing therethrough and situated over said plate opening so that a fluid which first passes upwardly through said plate opening will then pass upwardly through said opening of said lower cap,
  (b) an upper cap also having a downwardly directed hollow interior, said upper cap being situated above said lower cap to receive in its interior a fluid which flows upwardly through said opening of said lower cap, and said upper cap being lighter than said lower cap so as to be raised away from said lower cap before the latter is raised away from said plate during upward movement of a fluid through said openings,
  (c) guide means coacting with said caps to guide the latter for movement up and down with respect to each other and to said plate while maintaining said caps in substantial alignment with each other and with said plate opening,
  (d) first limiting means for limiting the extent of upward movement of said lower cap with respect to said plate, and
  (e) second limiting means for limiting the extent of upward movement of said upper cap with respect to said lower cap,
    (1) said second limiting means coacting with with said lower cap to cause said lower and said upper cap, upon upward movement of said upper cap and when said upper cap has reached a maximum distance from said lower cap, to maintain said maximum distance between each other while simultaneously moving upwardly wherein a spacer means is situated between said plate and said lower cap for situating the latter at a position spaced upwardly from said plate, and is fixed to and carried by said guide means, and wherein said guide means includes a plurality of substantially upright components extending through said lower cap above and below the same, said upright components extending through said plate opening to coact with said plate to guide said lower cap for movement with respect thereto and said upright components being situated adjacent the periphery of said upper cap to coact with the latter to guide the latter for vertical movement with respect to said lower cap, said spacer means including projections fixed to and projecting from said upright components between said plate and lower cap and engaging said lower cap, said upright components respectively having lugs extending over and engaging said lower cap to coact with said projections for fixing said upright components to said lower cap, and said limiting means including lower lateral projections fixed to and projecting laterally from said upright components at locations beneath said plate to engage the latter for limiting upward movement of said lower cap with respect thereto and upper lateral projections fixed to and projecting from said upright components to locations over said upper cap to limit upward movement of the latter with respect to said lower cap.

2. In a gas and liquid contact apparatus,
(A) a bubble tower plate formed with an opening passing therethrough, and
(B) a bubble cap assembly controlling the flow of gas or vapor upwardly through said plate opening to provide contact between the gas or vapor, on the one hand, and a liquid on said plate, on the other hand, said assembly comprising
   (a) a lower cap situated over said plate and having a downwardly directed hollow interior, said lower cap having an outer periphery larger than said plate opening and in substantial alignment therewith so that said lower cap extends beyond said plate opening over said plate, and said lower cap being formed with at least one opening passing therethrough and situated over said plate opening so that a fluid which first passes upwardly through said plate opening will then pass upwardly through said opening of said lower cap,
   (b) an upper cap also having a downwardly directed hollow interior, said upper cap being situated above said lower cap to receive in its interior a fluid which flows upwardly through said opening of said lower cap, and said upper cap being lighter than said lower cap so as to be raised away from said lower cap before the latter is raised away from said plate during upward movement of a fluid through said openings,
   (c) guide means coacting with said caps to guide the latter for movement up and down with respect to said plate while maintaining said caps in substantial alignment with each other and with said plate opening, and
   (d) limiting means coacting with said caps for limiting the extent of upward movement of said upper cap with respect to said lower cap and the extent of upward movement of said lower cap with respect to said plate, said guide means and limiting means coacting with said caps to provide
      (1) a first upward movement of said upper cap upwardly from said lower cap,
      (2) a second upward movement of said upper cap together with said lower cap when said upper cap, upon said first movement, has reached its maximum distance from said lower cap, with said lower cap moving upwardly from said plate during said second upward movement, and
      (3) maintaining said maximum distance between said lower and upper caps during said second upward movement,
      and whereby said guide means includes a plurality of elongated substantially upright components and said limiting means includes a plurality of elongated substantially horizontal components fixed to and projecting laterally from said upright components, and there are two groups of said upright and horizontal components, one of said groups being fixed to and carried by said upper cap and the other of said groups being fixed to and carried by said lower cap, and wherein said one group includes upright components fixed to and projecting downwardly from said upper cap through said opening of said lower cap to cooperate with said lower cap for guiding said upper cap during movement thereof with respect to said lower cap, and said one group including substantially horizontal components respectively projecting from lower ends of said upright components thereof beyond said opening of said lower cap into the hollow interior thereof and into overlapping relation with respect to a downwardly directed inner surface of said lower cap which surrounds said opening thereof, so that said horizontally extending components of said one group will engage said surface of said lower cap to limit upward movement of said upper cap with respect to said lower cap, and said other group including upright components fixed to said lower cap and extending therefrom downwardly through said plate opening for coacting with said plate to guide said lower cap for movement with respect thereto, and said other group including substantially horizontal components fixed to and projecting from said upright components of said other group to locations situated respectively beneath said plate for engaging a downwardly directed surface thereof to limit upward movement of said lower cap with respect to said plate.

3. In a gas and liquid contact apparatus,
(A) a bubble tower plate formed with an opening passing therethrough, and
(B) a bubble cap assembly controlling the flow of gas or vapor upwardly through said plate opening to provide contact between the gas or vapor, on the one hand, and a liquid on said plate, on the other hand, said assembly comprising ,
   (a) a lower cap situated over said plate and having a downwardly directed hollow interior, said lower cap having an outer periphery larger than said plate opening and in substantial alignment therewith so that said lower cap extends beyond said plate opening over said plate, and said lower cap being formed with at least one opening passing therethrough and situated over said plate opening so that a fluid which first passes upwardly through said plate opening will then pass upwardly through said opening of said lower cap,
   (b) an upper cap also having a downwardly directed hollow interior, said upper cap being situated above said lower cap to receive in its interior a fluid which flows upwardly through said opening of said lower cap, and said upper cap being lighter than said lower cap so as to be raised away from said lower cap before the latter is raised away from said plate during upward movement of a fluid through said openings,
   (c) guide means coacting with said caps to guide the latter for movement up and down with respect to said plate while maintaining said caps in substantial alignment with each other and with said plate opening, and
   (d) limiting means coacting with said caps for limiting the extent of upward movement of said upper cap with respect to said lower cap and the extent of upward movement of said lower cap with respect to said plate, said guide means and limiting means coacting with said caps to provide
- (1) a first upward movement of said upper cap upwardly from said lower cap,
- (2) a second upward movement of said upper cap together with said lower cap when said upper cap, upon said first movement, has reached its maximum distance from said lower cap, with said lower cap moving upwardly from said plate during said second upward movement, and
- (3) maintaining said maximum distance between said lower and upper caps during said second upward movement,
  - and whereby said guide means includes a plurality of elongated substantially upright components and said limiting means includes a plurality of elongated substantially horizontal components fixed to and projecting laterally from said upright components, and wherein said upright components include two groups one of which is carried by said upper cap and the other of which is carried by said plate, said one group including upright components fixed to and projecting downwardly from said upper cap through said opening of said lower cap to coact with the latter to guide said upper cap for movement with respect to said lower cap, and said limiting means including substantially horizontal components projecting laterally from said upright components of said one group beneath said lower cap into overlapping relation with a downwardly directed surface thereof which is situated beyond said opening thereof for engaging said downwardly directed surface to limit upward movement of said upper cap with respect to said lower cap, and the other of said two groups including upright components fixed to an upper surface of said plate in the region of the periphery of said lower cap for coacting with said periphery to guide said lower cap for movement with respect to said plate, said limiting means including substantially horizontal components fixed to said upright components of said other group and extending therefrom inwardly over said lower cap into overlapping relation therewith to engage said lower cap and limit the extent of upward movement thereof with respect to said plate.

4. In a gas and liquid contact apparatus,
(A) a bubble tower plate formed with an opening passing therethrough, and
(B) a bubble cap assembly controlling the flow of gas or vapor upwardly through said plate opening to provide contact between the gas or vapor, on the one hand, and a liquid on said plate, on the other hand, said assembly comprising
- (a) a lower cap situated over said plate and having a downwardly directed hollow interior, said lower cap having an outer periphery larger than said plate opening and in substantial alignment therewith so that lower cap extends beyond said plate opening over said plate, and said lower cap being formed with at least one opening passing therethrough and situated over said plate opening so that a fluid which first passes upwardly through said plate opening will then pass upwardly through said opening of said lower cap,
- (b) an upper cap also having a downwardly directed hollow interior, said upper cap being situated above said lower cap to receive in its interior a fluid which flows upwardly through said opening of said lower cap, and said upper cap being lighter than said lower cap so as to be raised away from said lower cap before the latter is raised away from said plate during upward movement of a fluid through said openings,
- (c) guide means coacting with said caps to guide the latter for movement up and down with respect to said plate while maintaining said caps in substantial alignment with each other and with said plate opening, and
- (d) limiting means coacting with said caps for limiting the extent of upward movement of said upper cap with respect to said lower cap and the extent of upward movement of said lower cap with respect to said plate, said guide means and limiting means coacting with said caps to provide
  - (1) a first upward movement of said upper cap upwardly from said lower cap,
  - (2) a second upward movement of said upper cap together with said lower cap when said upper cap, upon said first movement, has reached its maximum distance from said lower cap, with said lower cap moving upwardly from said plate during said second upward movement, and
  - (3) maintaining said maximum distance between said lower and upper caps during said second upward movement,
    - and whereby said guide means includes a plurality of elongated substantially upright components and said limiting means includes a plurality of elongated substantially horizontal components fixed to and projetcing laterally from said upright components, and wherein said guide means is carried only by said lower cap and includes a plurality of substantially upright components fixed to and projecting laterally from lower cap above and below the same, said limiting means including upper substantially horizontal components fixed to and projecting laterally from extending laterally therefrom to locations situated over said upper cap to limit upward movement thereof with respect to said lower cap, said limiting means further including lower substantially horizontal components fixed to said upright components and projecting laterally therefrom to locations situated beneath a downwardly directed surface of said plate which is situated beyond said opening thereof for engaging the latter surface to limit upward movement of said lower cap with respect to said plate, said upright components coacting on the one hand with said plate to guide said lower cap for movement with respect thereto and on the other hand with said upper cap to guide the latter for movement with respect to said lower cap.

5. In a gas and liquid contact apparatus,
(A) a bubble tower plate formed with an opening passing therethrough, and (B) a bubble cap assembly controlling the flow of gas or vapor upwardly through said plate opening to provide contact between the gas or vapor, on the one hand, and a liquid on said plate, on the other hand, said assembly comprising (a) a lower cap situated over said plate and having a downwardly directed hollow interior, said lower cap having an outer periphery larger than said plate opening and in substantial alignment therewith so that said lower cap extends beyond said plate opening over said plate, and said lower cap being formed with at least one opening passing therethrough and situated over said plate opening so that a fluid which first passes upwardly through said plate opening will then pass upwardly through said opening of said lower cap, (b) an upper cap also having a downwardly directed hollow interior, said upper cap being situated above said lower cap to receive in its interior a fluid which flows upwardly through said opening of said lower cap, and said upper cap being lighter than said lower cap so as to be raised away from said lower cap before the latter is raised away from said plate during upward movement of a fluid through said openings, (c) guide means coacting with said caps to guide the latter for movement up and down with respect to said plate while maintaining said caps in substantial alignment with each other and with said plate opening, and (d) limiting means coacting with said caps for limiting the extent of upward movement of said upper cap with respect to said lower cap and the extent of upward movement of said lower cap with respect to said plate, said guide means and limiting means coacting with said cap to provide (1) a first upward movement of said upper cap upwardly from said lower cap, (2) a second upward movement of said upper cap together with said lower cap when said upper cap, upon said first movement, has reached its maximum distance from said lower cap, with said lower cap moving upwardly from said plate during said second upward movement, and (3) maintaining said maximum distance between said lower and upper caps during said second upward movement, and wherein lug means and spacer means are provided on said guide means and engage the upper and lower surface, respectively, of said lower cap, thereby fixing said guide means to said lower cap, said spacer means spacing said lower cap from said plate.

References Cited

UNITED STATES PATENTS

| 2,982,527 | 5/1961 | Eld et al. | 261—114 |
| 3,013,782 | 12/1961 | Glitsch | 261—114 |
| 3,019,003 | 1/1962 | Glitsch | 261—114 |
| 3,037,754 | 6/1962 | Glitsch | 261—114 |
| 3,162,701 | 12/1964 | Joor | 261—114 |
| 3,287,004 | 11/1966 | Nutter | 261—114 |

FOREIGN PATENTS

| 1,237,299 | 6/1960 | France. |
| 936,500 | 9/1963 | Great Britain. |

RONALD R. WEAVER, *Primary Examiner.*

U.S. Cl. X.R.

202—158